US010045185B1

(12) United States Patent
Reed et al.

(10) Patent No.: US 10,045,185 B1
(45) Date of Patent: Aug. 7, 2018

(54) DYNAMIC ADVERTISEMENT DATA

(71) Applicant: Caterpillar Inc., Peoria, IL (US)

(72) Inventors: Joshua D. Reed, Galesburg, IL (US); Bradley F. Bergerhouse, Peoria, IL (US); Arjun Veneshetty, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/479,363

(22) Filed: Apr. 5, 2017

(51) Int. Cl.
   *H04W 4/80* (2018.01)
   *H04W 4/00* (2018.01)
   *H04W 76/02* (2009.01)
   *H04W 76/14* (2018.01)

(52) U.S. Cl.
   CPC ............ *H04W 4/80* (2018.02); *H04W 4/008* (2013.01); *H04W 76/023* (2013.01); *H04W 76/14* (2018.02)

(58) Field of Classification Search
   CPC .......................... H04W 4/008; H04W 76/023
   See application file for complete search history.

(56) References Cited

U.S. PATENT DOCUMENTS

| 8,847,754 | B2 | 9/2014 | Arne |
| 9,443,402 | B2 | 9/2016 | Olodort |
| 2011/0070827 | A1 | 3/2011 | Griffin et al. |
| 2015/0289124 | A1 | 10/2015 | Palin et al. |
| 2016/0183077 | A1* | 6/2016 | Wang .................... H04W 8/005 455/41.2 |
| 2016/0198290 | A1 | 7/2016 | Hong et al. |
| 2016/0269979 | A1 | 9/2016 | Ide et al. |
| 2017/0055108 | A1* | 2/2017 | Jeon ..................... H04W 4/008 |
| 2017/0230988 | A1* | 8/2017 | Zhou .................. H04W 72/121 |

FOREIGN PATENT DOCUMENTS

| CA | 2715424 A1 | 3/2011 |
| CA | 2715426 A1 | 3/2011 |
| TW | 201613524 A | 4/2016 |

* cited by examiner

*Primary Examiner* — Tuan H Nguyen
(74) *Attorney, Agent, or Firm* — Miller, Matthias & Hull

(57) ABSTRACT

A sender device is provided. The sender device may include a peripheral device, a transceiver in communication with at least one recipient device, and a controller in communication with the peripheral device and the transceiver. The controller may be configured to receive a signal from the peripheral device, determine a state of the sender device based on the signal, select an advertisement packet based on the state of the sender device, and transmit the advertisement packet to at least one recipient device including data requested by the recipient device.

18 Claims, 4 Drawing Sheets

DYNAMIC ADVERTISEMENT DATA

TECHNICAL FIELD

The present disclosure relates generally to wireless mobile devices, and more particularly, to devices, systems and methods for wirelessly communicating advertisement packets or data.

BACKGROUND

Wireless modes of communication are increasingly more prevalent in a wide variety of different applications. Among other available wireless standards, Bluetooth is often the protocol of choice in many mobile devices especially for short-range uses. Bluetooth-enabled devices typically employ short-wavelength ultra-high frequencies, approximately between 2.400 GHz and 2.485 GHz, to establish a wireless network and simultaneously exchange data between multiple enabled devices. In a typical arrangement, a sender or broadcasting device broadcasts various advertisement data or packets to recipient devices that are within communicable range. In general, advertisement data refers to data concerning the broadcasting device. Advertisement packets refer to strings of information that include details of the broadcasting device, such as the health of the battery or battery life remaining in the device, the state of charge of the battery of the device, the total time the device has been active, the unique identifier of the device, the type of tool the device is attached or otherwise associated with, and the like.

Conventional advertisement packets are generally broadcast in a static manner. In other words, the same type and/or amount of information is repeatedly broadcast to the same recipient devices. Although such conventions may be acceptable, there is some room for improvement. More specifically, because substantially the same information is repeated in each advertisement packet, much of the broadcasted information may often be redundant or unnecessary. Transmission of unnecessary data consumes processing power, memory, energy resources, and the like, all of which may be better spent on transmitting more relevant information or performing other functions. This may be especially relevant in battery-operated devices where efficiency and battery life are important. Efficient use of each advertisement packet is also useful where the amount of information that can be broadcast is limited. In Bluetooth applications, for instance, the amount of advertisement data that can be transmitted is much more limited prior to successful pairing.

Some modifications to the general advertisement scheme have been proposed to improve the overall efficiency of wirelessly communicating advertisement data. For instance, the solution in U.S. Pub. No. 2016/0183077 ("Wang") discloses a method for reducing connection latency in transmitting advertisement data. Specifically, the method in Wang proposes quicker transmission rates by selectively accelerating the transmission of an advertisement packet based on the manner by which the advertisement packet is received. The method in Wang may help to reduce latency in transmitting advertisement packets. However, Wang does not adequately address the limitations on the amount of advertisement data that can be transmitted between Bluetooth enabled devices prior to pairing. Furthermore, Wang does not overcome the drawbacks associated with broadcasting static or redundant advertisement packets.

The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one aspect of the present disclosure, a sender device is provided. The sender device may include a peripheral device configured to output a signal corresponding to a condition of the sender device, a transceiver in communication with at least one recipient device, a controller in communication with the peripheral device and the transceiver. The controller may be configured to receive the signal from the peripheral device, determine a state of the sender device based on the signal, select an advertisement packet based on the state of the sender device, and transmit the advertisement packet to the recipient device to enable detection of the sender device.

In another aspect of the present disclosure, a controller of a sender device is provided. The controller may include a receiver module configured to receive a signal from a peripheral device of the sender device, an analyzer module configured to determine a state of the sender device based on the signal, a selector module configured to select an advertisement packet based on the state of the sender device, and a transmitter module configured to transmit the selected advertisement packet to at least one recipient device.

In yet another aspect of the present disclosure, a method of broadcasting advertisement data is provided. The method may include receiving a signal from at least one peripheral device, determining a state of the sender device based on the signal, selecting an advertisement packet based on the state of the sender device, and transmitting the selected advertisement packet to at least one recipient device.

These and other aspects and features will be more readily understood when reading the following detailed description in conjunction with the accompanying drawings.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Figure 1:
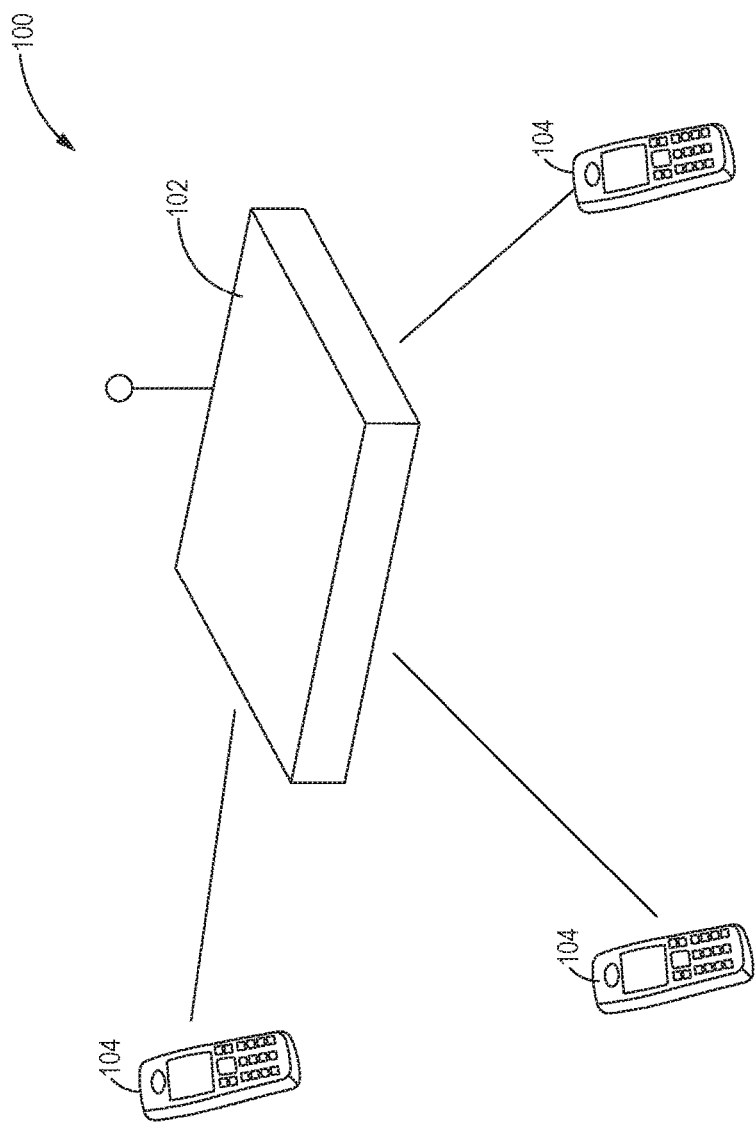
FIG. 1 is a schematic view of an advertisement system that embodies an exemplary broadcasting device of the present disclosure.

Referring now to FIG. 1, one exemplary embodiment of an advertisement system 100 of the present disclosure is provided. As shown, the advertisement system 100 may include one or more broadcasting or sender devices 102, each of which may establish a wireless network with one another and/or with one or more recipient devices 104. The sender device 102 and the recipient devices 104 may be spatially fixed or portable, and representative of mobile devices, such as mobile phones, smart phones, tablets, smart watches, laptop computers, portable headsets, earpieces, car audio systems, and any other portable computational device or accessory with wireless connectivity. Although the sender device 102 may be configured to exchange data with one or more of the recipient devices 104 using Bluetooth, the techniques described herein may also be extended for use with any other comparable modes of communication. Moreover, the sender device 102 may be configured to automatically establish a preliminary mode of connectivity with any enabled recipient device 104 that is within range of the sender device 102.

In particular, a preliminary mode of connectivity refers to the initial connection which enables pairing and other handshake procedures commonly used in the art to wirelessly connect two or more devices. The connection, device functionality and/or data exchanged during the preliminary mode is typically limited to those required for pairing and other handshake procedures. Between Bluetooth-enabled devices, for instance, connectivity and/or device functionality may be reduced during a preliminary pairing mode and until pairing is successful. As discussed with respect to FIG. 1, the sender device 102 may employ a Bluetooth protocol to establish connectivity with recipient devices 104 that are within appropriate range. If using Bluetooth, for instance, the sender device 102 may initially establish a preliminary mode of connectivity with enabled recipient devices 104 as soon as the recipient devices 104 are within range of the sender device 102. Once the preliminary mode of connectivity has been established, the sender device 102 may transmit advertisement data or advertisement packets to the connected recipient devices 104. Moreover, the sender device 102 may transmit the advertisement data or advertisement packets such that recipient devices 104 within range can detect the sender device 102. Broadcasting the advertisement data or advertisement packets may be useful for various purposes, such as, but not limited to, tracking the presence of the key fobs, asset trackers, personnel, engine runtimes, yard management, and/or any other suitable application.

The contents of the advertisement data or advertisement packets that are broadcast by the sender device 102 may include any variety of different information. In general, advertisement data may include data concerning and/or identifying the broadcasting or sender device 102. The advertisement data may be packaged and transmitted in the form of advertisement packets, and may include strings of details relating to the sender device 102. For example, advertisement packets may include data corresponding to the health of the battery or battery life remaining in the sender device 102, the amount of charge remaining in the battery of the sender device 102, the total time the sender device 102 has been active or inactive, a unique identifier or other address information of the sender device 102, the type of tool or accessory to which the sender device 102 is attached or otherwise associated with, and/or the like. As discussed in more detail further below, the advertisement packets may be dynamically modified to further include information relating to the proximity, location, movement, and/or other information of the sender device 102.

Figure 2:
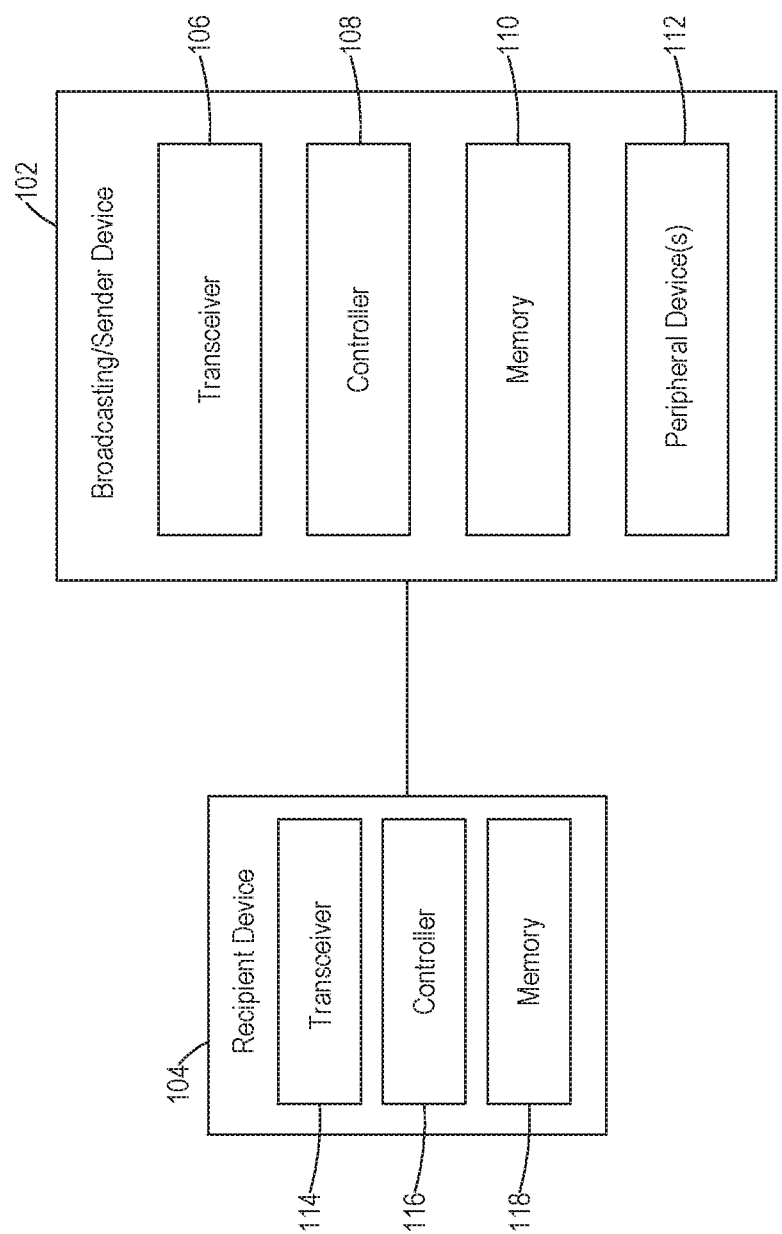
FIG. 2 is a diagrammatic view of a recipient device and a sender device of the advertisement system of the present disclosure.

Turning now to FIG. 2, exemplary embodiments of a broadcasting or sender device 102 and a recipient device 104 are provided in more detail. As shown, the sender device 102 may include at least a transceiver 106, a controller 108, a memory 110, and one or more peripheral devices 112. The transceiver 106 may be implemented using a radio frequency or other communication device configured to wirelessly transmit data to and receive data from one or more recipient devices 104 within range. For example, the transceiver 106 may be configured to employ Bluetooth to exchange data. The controller 108 may be implemented using microcontrollers, processors, microprocessors, field programmable gate arrays (FPGAs), digital signal processors (DSPs), and/or any other programmable device. The memory 110 may be situated within or on board the controller 108 and/or made otherwise accessible to the controller 108, and implemented using any suitable technology, such as nonvolatile memory, static random access memory (SRAM), synchronous dynamic random access memory (SDRAM), and/or the like.

As shown in FIG. 2, the sender device 102 may also include one or more peripheral devices 112. The peripheral devices 112 may include sensory devices, proximity devices and/or tracking devices that may be pre-installed in or otherwise available to the controller 108 of the sender device 102. For example, the peripheral devices 112 may include proximity sensors, vibration sensors, accelerometers, temperature sensors, pressure sensors, gyroscopes, geographical positioning devices, or any other device capable of monitoring relative the location, proximity, movement, and/or any other information relevant to the sender device 102. Moreover, the peripheral devices 112 may include devices capable of detecting changes in the sender device 102, that can further help the controller 108 identify a current state of the sender device 102. As discussed in more detail further below, the state of the sender device 102 may be determined based on the physical position, motion and/or condition of the sender device 102. Furthermore, the state of the sender device 102 may be used to determine the types of data to be included in the advertisement packet.

As shown in FIG. 2, the recipient device 104 may also include a corresponding transceiver 114, controller 116, and memory 118. Although not shown, the recipient device 104 may also include other elements commonly found in mobile devices, such as mobile phones, smart phones, tablets, smart watches, laptop computers, and/or the like. Similar to the transceiver 106 of the sender device 102, the transceiver 114 of the recipient device 104 may also use Bluetooth to wirelessly exchange data with a sender device 102 once in range. The controller 116 may also be implemented using microcontrollers, processors, microprocessors, FPGAs, DSPs, and/or any other programmable device suitable for use with the recipient device 104. Among other tasks, the controller 116 of the recipient device 104, in conjunction with the memory 118, may communicate with and operate at least the transceiver 114. Also, the memory 118 may be situated within or on board the controller 116 and/or made otherwise accessible thereto, and implemented using nonvolatile memory, SRAM, SDRAM, or the like.

Figure 3:
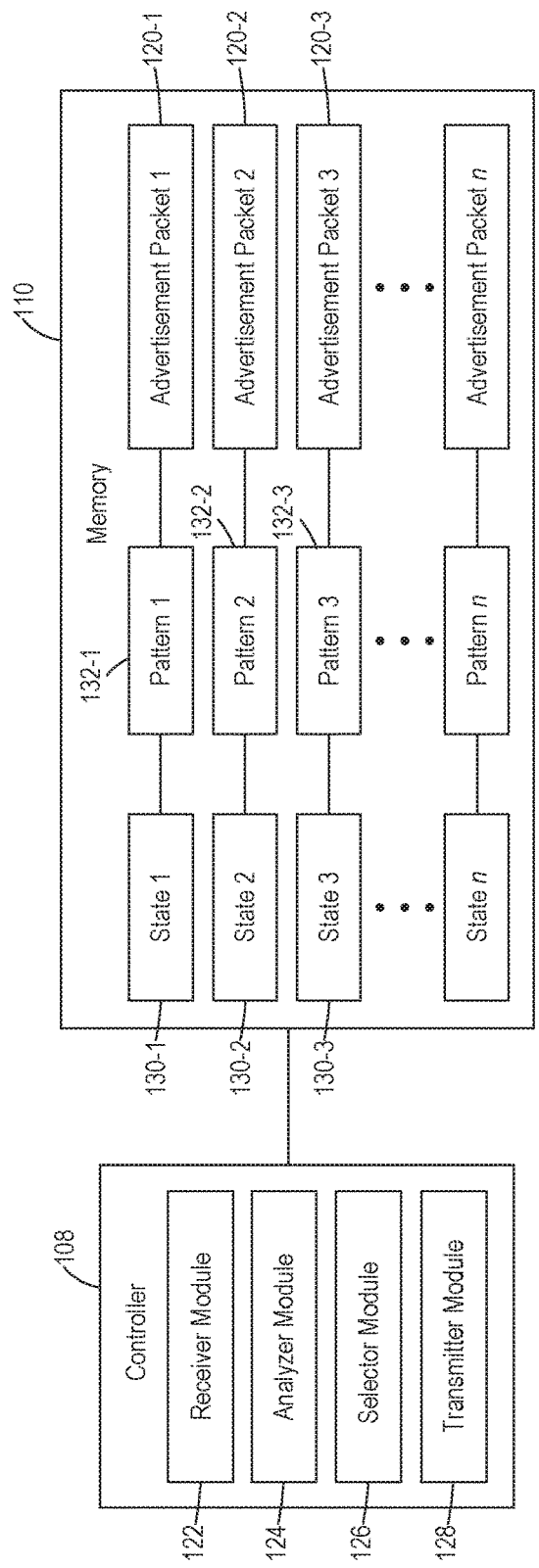
FIG. 3 is a diagrammatic view of a controller of the sender device of the present disclosure.

Still referring to FIG. 2, and with further reference to FIG. 3, the controller 108 of the sender device 102 may be configured to dynamically select different types of advertisement data, to transmit to the recipient device 104 based on feedback obtained via peripheral signals, or signals supplied by local peripheral devices 112. In particular, the controller 108 may be preprogrammed according to one or more sets of algorithms or code that can generally be categorized into different modules, or combinations of hardware and software, that are distinguishable by the types of tasks that are performed by the controller 108 to transmit advertisement packets 120 to recipient devices 104. As shown in FIG. 3, the controller 108 may be preprogrammed to include, for example, a receiver module 122, an analyzer module 124, a selector module 126, and a transmitter module 128. While only one arrangement of modules is shown as an example, it will be understood by those of ordinary skill in the art that other arrangements may also be implemented to achieve comparable results.

As shown in FIG. 3, and as referenced in FIG. 2, the receiver module 122 may be configured to receive one or more peripheral signals from the peripheral devices 112. Peripheral signals may include digital or otherwise electronic signals that are generated by the peripheral devices 112. For example, the peripheral signals may be indicative of or contain information corresponding to the proximity or location of the sender device 102 relative to the recipient device 104, movements detected by or within the sender device 102, or any other information relevant to a state 130 of the sender device 102. The state 130 herein refers to any physical position, motion or condition of the sender device 102 that may be detectable and relevant to determining the type of advertisement data to broadcast. For instance, if one of the available peripheral devices 112 includes an accelerometer, the peripheral signal may be indicative of movements of the sender device 102 that are sensed by the accelerometer. Such information may be used to derive other relevant information, such as vibrations of the sender device 102. Still further, observations of patterns in the vibrations may be used to select and broadcast different advertisement data. In still further alternative embodiments, the peripheral signals may be indicative of changes in temperature, changes in pressure, and/or any other parameter relevant to the sender device 102.

The analyzer module 124 of FIG. 3 may also determine the state 130 of the sender device 102, which may suggest a current condition of the sender device 102, such as whether the sender device 102 is stationary or moving. If movement is detected, the state 130 may further classify the type of movement. In an industrial setting, for example, the state 130 may identify the operating state of an associated engine, work tool, vehicle or machine, the position or movement of a work tool, vehicle or machine, the presence of a work tool, vehicle or machine on a flat bed, and the like. In a consumer setting, the state 130 may identify whether a user of the sender device 102 is sitting, standing, walking, jogging, riding a bicycle, driving, talking on the phone, taking a photo, and/or the like. The analyzer module 124 may distinguish between different states 130 based on observable patterns within the peripheral signals. The analyzer module 124 may compare any observable patterns to predefined patterns 132 preprogrammed in memory 110, such as in the form of lookup tables, maps, or the like, identify the pattern 132 most closely matching the observed pattern, and further identify the state 130 of the sender device 102 based on the matching pattern 132.

Once the state 130 has been determined, the selector module 126 of FIG. 3 may select an advertisement packet 120 most relevant to the identified state 130. Again, the selector module 126 may be configured to refer to a plurality of predefined states 130 and associated advertisement packets 120 preprogrammed in memory 110, such as in the form of lookup tables, maps, or the like. In industrial settings, the predefined states 130 may include the operating state of an associated engine, work tool, vehicle or machine, the position or movement of a work tool, vehicle or machine, the presence of a work tool, vehicle or machine on a flat bed, and the like. In consumer settings, the state 130 may include user actions, such as sitting, standing, walking, jogging, riding a bicycle, driving, talking on the phone, taking a photo, and/or the like. The analyzer module 124 may distinguish between different states 130 based on observable patterns within the peripheral signals. For instance, the analyzer module 124 may compare any observable patterns to predefined patterns 132 preprogrammed in memory 110, such as in the form of lookup tables, maps, or the like, identify the pattern 132 most closely matching the observed pattern, and further identify the state 130 of the sender device 102 based on the matching pattern 132.

Furthermore, depending on the state 130 identified, the selector module 126 of FIG. 3 may select, and the transmitter module 128 of FIG. 3 may transmit, one or more of the health of the battery or battery life remaining in the sender device 102, the amount of charge remaining in the battery of the sender device 102, the total time the sender device 102 has been active or inactive, a unique identifier or other address information of the sender device 102, the type of tool or accessory to which the sender device 102 is attached or otherwise associated with, and/or the like. The advertisement data or packets 120 described herein may be wirelessly transmitted or broadcast from the sender device 102 to recipient devices 104 using Bluetooth protocols. Moreover, the advertisement data or packets 120 may contain information that is required or employed by the recipient devices 104, or more particularly, required or employed by applications running thereon. For example, applications operating on the recipient devices 104 may employ the advertisement data contained within the advertisement packets 120 for various purposes, such as for monitoring operating parameters of tools, machinery, or vehicles within which the sender device 102 may be installed.

The advertisement systems 100 and broadcasting or sender devices 102 have been described in manner best suited for transmission via Bluetooth. However, it will be understood that similar schemes may be employed for any other mode of wireless communication that is comparable to such Bluetooth protocols. In other modifications for instance, advertisement or related data may be transmitted to the recipient devices 104 in the form of message prompts, notifications, scan codes, bar codes, graphics or images, audible tones, music, videos, and/or any other form of delivery to the recipient device 104. Also, while only one possible configuration is discussed, other combinations of states 130, patterns 132 and associated advertisement packets 120 may be implemented. For example, the absence of identifiable patterns in the peripheral signal may be classified as a separate state 130, which transmits advertisement data in a less efficient and less refined manner. Yet another state 130 may be used to classify situations in which all peripheral devices 112 of the sender device 102 are disabled or inaccessible, where advertisement data is broadcast in an even less efficient and less refined manner. Furthermore, while only three different states 130 are specifically described, it will be understood that there may be fewer or more than three states 130 in a given application. In general, the advertisement system 100 is able to operate more efficiently, and thereby consume less power, when peripheral feedback is available.

INDUSTRIAL APPLICABILITY

In general, the present disclosure sets forth devices, systems and methods for selectively distributing advertisement data which may be applicable and beneficial to a wide variety of wireless communication applications. Specifically, the present disclosure may find utility in environments where a plurality of battery-powered devices are in wireless communication with one another, but not always active. In particular, the present disclosure provides a broadcasting or sender device configured to simultaneously transmit more refined advertisement data to different people in a given setting. By employing peripheral feedback, the present disclosure is able to select and convey less information per transmission, which may be beneficial where connectivity is limited, such as during the pre-pairing stage of a Bluetooth connection. Furthermore, by transmitting only relevant content and filtering out unnecessary information typically found in conventional advertisement packets, the present disclosure is able to conserve power, which may be beneficial to battery-operated devices.

Figure 4:
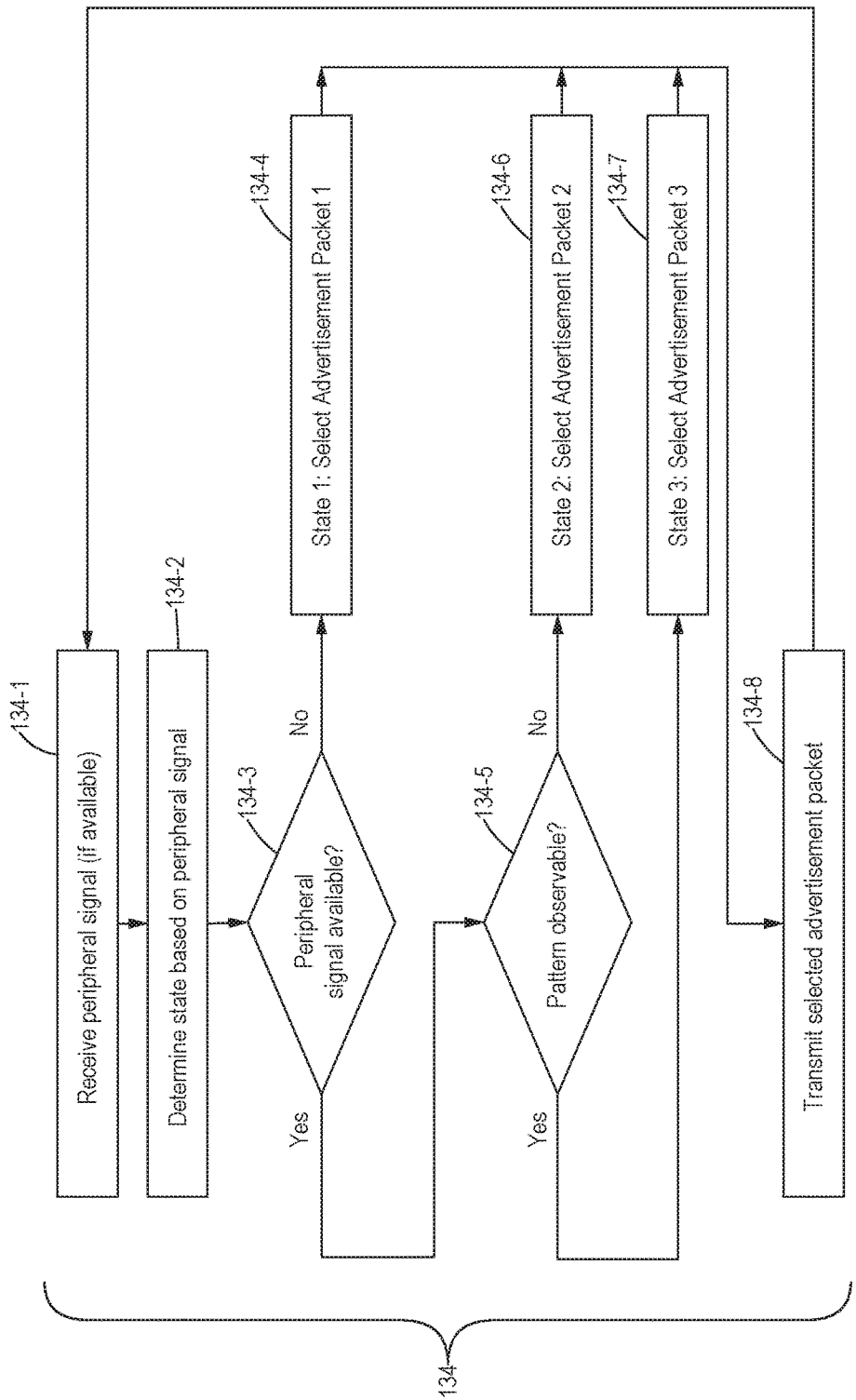
FIG. 4 is a flow diagram of an exemplary method of wirelessly communicating advertisement data.

Turning now to FIG. 4, one exemplary algorithm or method 134 by which a sender device 102 can broadcast advertisement data is provided. In general, the sender device 102 may be configured to broadcast advertisement data continuously irrespective of whether recipient devices 104 are within communicable range. In other embodiments, the sender device 102 may be configured to broadcast advertisement data selectively, such as only when at least one recipient device 104 is within communicable range. In either configuration, the method 134 in block 134-1 may initially begin receiving peripheral signals from a peripheral device 112 that may be accessible or available on the sender device 102. For example, if a peripheral device 112 is available and includes an accelerometer, the method 134 may receive an accelerometer signal corresponding to any movement or vibration detected by the accelerometer. Similarly, in sender device 102 with other types of peripheral devices 112, the method 134 may receive other forms of information that may be relevant to determining the type of advertisement packet 120 to transmit. For instance, the method 134 may additionally or alternatively receive information related to any changes in temperature and/or pressure associated with the sender device 102.

As shown in block 134-2 of FIG. 4, the method 134 may further determine a state 130 of the sender device 102 based on the peripheral signal, or in some embodiments, based on the lack thereof. In particular, the method 134 in block 134-3 may initially determine whether a peripheral signal is available. A peripheral signal may be unavailable when the sender device 102 is not equipped with relevant peripheral devices 112, or when the peripheral devices 112 are not accessible at a given moment. If a peripheral signal is not available, the method 134 according to block 134-4 may identify the sender device 102 as being in a generalized or first state 130-1, and select a corresponding first advertisement packet 120-1 for transmission. For example, the first state 130-1 may suggest transmitting a conventional advertisement packet 120-1, which may include more device or advertisement data than necessary, but may be more readily acceptable by recipient devices 104. If, however, a peripheral signal is available, the method 134 may proceed to block 134-5 to determine whether there are any identifiable patterns within the peripheral signal. As discussed in connection with FIG. 3, for example, the controller 108 may determine if patterns in the peripheral signal approximate any of the predefined patterns 132 stored in memory 110.

If no identifiable pattern can be observed in block 134-5, the method 134 according to block 134-6 of FIG. 4 may identify the sender device 102 as being in a second state 130-2, which may suggest transmitting a second advertisement packet 120-2. The second advertisement packet 120-2 may be more refined and contain fewer unnecessary data than the conventional first advertisement packet 120-1. If, however, the peripheral signal includes an identifiable pattern that closely approximates one of the available predefined patterns 132 stored in memory 110, the method 134 according to block 134-7 may identify the sender device 102 as being in a third state 130-3 and select a third advertisement packet 120-3 for transmission. The third advertisement packet 120-3 may be even more refined and contain even less unnecessary data than the first advertisement packet 120-1 and the second advertisement packet 120-2. Accordingly, having more available peripheral feedback may allow for more efficient broadcasts, which can further help conserve power.

Depending on the state 130 identified and/or the patterns observed in FIG. 4, the advertisement packet 120 may be selected to include one or more of the health of the battery or battery life remaining in the sender device 102, the amount of charge remaining in the battery of the sender device 102, the total time the sender device 102 has been active or inactive, a unique identifier or other address information of the sender device 102, the type of tool or accessory to which the sender device 102 is attached or otherwise associated with, and the like. Furthermore, in block 134-8 of FIG. 4, the method 134 may be configured to transmit the selected advertisement packet 120 to the recipient device 104. The manner in which the advertisement packet 120 is delivered to the recipient device 104 may vary depending on user settings or permissions. Although only one iteration is disclosed, it will be understood that any one or more of the processes of the method 134 of FIG. 4 may be performed simultaneously or in other sequences than shown. In addition, although only three states 130 are identified in FIG. 4, it will be understood that the method 134 may similarly operate with fewer or more than three states 130.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A sender device, comprising:
a peripheral device configured to output a signal corresponding to a condition of the sender device;
a transceiver in communication with at least one recipient device;
a controller in communication with the peripheral device and the transceiver, the controller configured to:
receive the signal from the peripheral device,
wherein the peripheral device includes an accelerometer, and
wherein the signal, received from the peripheral device, includes an accelerometer signal,
determine, based on the accelerometer signal, a state of the sender device as one of a first state, a second state, and a third state,
wherein the first state is indicative of a stationary sender device with an inactive accelerometer, the second state is indicative of a moving sender device with an active accelerometer but no detectable vibrational pattern, and the third state is indicative of a moving sender device with an active accelerometer and a detectable vibrational pattern,
select an advertisement packet based on the state of the sender device, and
transmit the advertisement packet to the recipient device to enable detection of the sender device.

2. The sender device of claim 1, wherein the transceiver is configured to wirelessly communicate with the recipient device via one or more Bluetooth protocols prior to pairing.

3. The sender device of claim 1, wherein the controller is configured to:
 determine the state of the sender device as one of a first state, a second state, and a third state based on the signal,
 transmit a first advertisement packet to the recipient device when the first state is determined,
 transmit a second advertisement packet to the recipient device when the second state is determined, and
 transmit a third advertisement packet to the recipient device when the third state is determined.

4. The sender device of claim 1, wherein the controller is configured to:
 communicate with a memory retrievably storing a plurality of different reference patterns and a plurality of different advertisement packets, each advertisement packet corresponding to a different reference pattern.

5. The sender device of claim 4, wherein the controller is configured to:
 compare observed patterns in the signal to the plurality of different reference patterns,
 identify a reference pattern, out of the plurality of different reference patterns, that most matches the observed patterns, and
 transmit the advertisement packet corresponding to the identified reference pattern.

6. A controller of a sender device, comprising:
 a receiver module configured to receive a signal from a peripheral device of the sender device;
 an analyzer module configured to determine a state of the sender device based on the signal,
  wherein, when determining the state of the sender device, the analyzer module is to:
   compare observed patterns in the signal to a plurality of reference patterns, and
   identify a reference pattern that most matches the observed patterns;
 a selector module configured to select an advertisement packet based on the state of the sender device,
  wherein, when selecting the advertisement packet, the selector module is to select the advertisement packet corresponding to the identified reference pattern; and
 a transmitter module configured to transmit the selected advertisement packet to at least one recipient device.

7. The controller of claim 6, wherein each of the receiver module and the transmitter module is configured to wirelessly communicate with the recipient device via one or more Bluetooth protocols prior to pairing.

8. The controller of claim 6, wherein the analyzer module is configured to determine the state of the sender device as one of a first state, a second state, and a third state based on observed patterns detected in the signal, the selector module configured to select a first advertisement packet when the first state is determined, select a second advertisement packet when the second state is determined, and transmit a third advertisement packet when the third state is determined.

9. The controller of claim 8, wherein the signal includes an accelerometer signal.

10. The controller of claim 8, wherein the first state is indicative of a stationary sender device with an inactive accelerometer, the second state is indicative of a moving sender device with an active accelerometer but no detectable vibrational pattern, and the third state is indicative of a moving sender device with an active accelerometer and a detectable vibrational pattern.

11. The controller of claim 6, wherein the peripheral device peripheral device includes an accelerometer.

12. The controller of claim 6, wherein the plurality of reference patterns are stored, in a memory, with a plurality of different advertisement packets, and
 wherein each advertisement packet corresponds to a different reference pattern of the plurality of reference patterns.

13. A method of broadcasting advertisement data, the method comprising:
 receiving a signal from at least one peripheral device;
 determining a state of the sender device based on the signal,
  wherein the state of the sender device is determined as one of a first state, a second state, and a third state based on observed patterns in the signal;
 selecting an advertisement packet based on the state of the sender device,
  wherein the advertisement packet is selected as one of a first advertisement packet, a second advertisement packet, or a third advertisement packet, and
  wherein the first state is indicative of a stationary sender device with an inactive accelerometer, the second state is indicative of a moving sender device with an active accelerometer but no detectable vibrational pattern, and the third state is indicative of a moving sender device with an active accelerometer and a detectable vibrational pattern; and
 transmitting the selected advertisement packet to at least one recipient device.

14. The method of claim 13, wherein communications with the recipient device are performed wirelessly via one or more Bluetooth protocols prior to pairing.

15. The method of claim 13, wherein selecting the advertisement packet includes: selecting the first advertisement packet when the first state is determined, selecting the second advertisement packet when the second state is determined, and selecting the third advertisement packet when the third state is determined.

16. The method of claim 13, wherein the signal includes an accelerometer signal.

17. The method of claim 13, further comparing observed patterns in the signal to a plurality of reference patterns, identifying a reference pattern that most matches the observed patterns, and selecting the advertisement packet corresponding to the identified reference pattern.

18. The method of claim 13, wherein the at least one peripheral device includes an accelerometer.

* * * * *